United States Patent
Kawamura et al.

(10) Patent No.: US 9,718,394 B2
(45) Date of Patent: Aug. 1, 2017

(54) HEADLIGHT-AFFIXING STRUCTURE

(71) Applicant: HONDA MOTOR CO., LTD., Tokyo (JP)

(72) Inventors: Kazuyuki Kawamura, Wako (JP); Keiichiro Tsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/902,134

(22) PCT Filed: Apr. 15, 2014

(86) PCT No.: PCT/JP2014/060690
§ 371 (c)(1),
(2) Date: Dec. 30, 2015

(87) PCT Pub. No.: WO2015/001832
PCT Pub. Date: Jan. 8, 2015

(65) Prior Publication Data
US 2016/0311361 A1  Oct. 27, 2016

(30) Foreign Application Priority Data
Jul. 2, 2013  (JP) ................................. 2013-138907

(51) Int. Cl.
*B60Q 1/04*  (2006.01)

(52) U.S. Cl.
CPC ............. *B60Q 1/0433* (2013.01); *B60Q 1/04* (2013.01); *B60Q 1/0483* (2013.01);
(Continued)

(58) Field of Classification Search
CPC .. B60Q 1/0433; B60Q 1/0483; B60Q 1/0491; B60Q 1/2619; B60Q 1/2623;
(Continued)

(56) References Cited

U.S. PATENT DOCUMENTS 6,357,821 B1 * 3/2002 Maj et al. ............ B60Q 1/0035
296/193.09
2005/0275250 A1 * 12/2005 Wada .................. B60Q 1/0433
296/203.02

FOREIGN PATENT DOCUMENTS

EP  1 481 878 A1  12/2004
JP  2007-090916  4/2007
(Continued)

OTHER PUBLICATIONS

International Search Report, Date of mailing: Jul. 8, 2014 (Jul. 8, 2014).
European Search Report dated Jan. 10, 2017.

*Primary Examiner* — Y M. Lee
(74) *Attorney, Agent, or Firm* — Rankin, Hill & Clark LLP

(57) ABSTRACT

A headlight-affixing structure for affixing a headlight positioned above a front bumper to a vehicle by using a headlight bracket. When viewed from the front, the headlight bracket is substantially formed into an L-shape and comprises a horizontal section extending in the vehicle-width direction along the lower edge of the headlight, and an upright section extending upward from an end of the horizontal section on the inside thereof in the vehicle-width direction. The upright section of the headlight bracket is provided with an upper affixing part for affixing the upper section of the headlight by using a downward-facing fastening member. The middle-outside section of the horizontal section is provided with a lower affixing part for affixing the lower section of the headlight by using an upward-facing fastening member.

13 Claims, 13 Drawing Sheets

(52) U.S. Cl.
CPC ........ *B60Q 1/0491* (2013.01); *B60Y 2304/03* (2013.01); *B60Y 2304/05* (2013.01)

(58) Field of Classification Search
CPC B60Q 1/0408; B60Q 1/0683; B60Y 2304/03; B60Y 2304/05; B60R 19/50; B60R 2019/505
See application file for complete search history.

(56) References Cited

FOREIGN PATENT DOCUMENTS

| | | |
|---|---|---|
| JP | 2010-241375 | 10/2010 |
| JP | 2011-016386 | 1/2011 |
| JP | 2011-073661 | 4/2011 |
| JP | 2012-062017 | 3/2012 |
| WO | 2012/001800 | 1/2012 |

\* cited by examiner

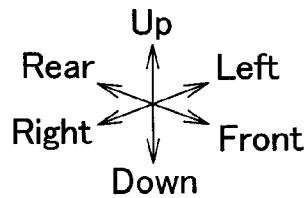
FIG.8
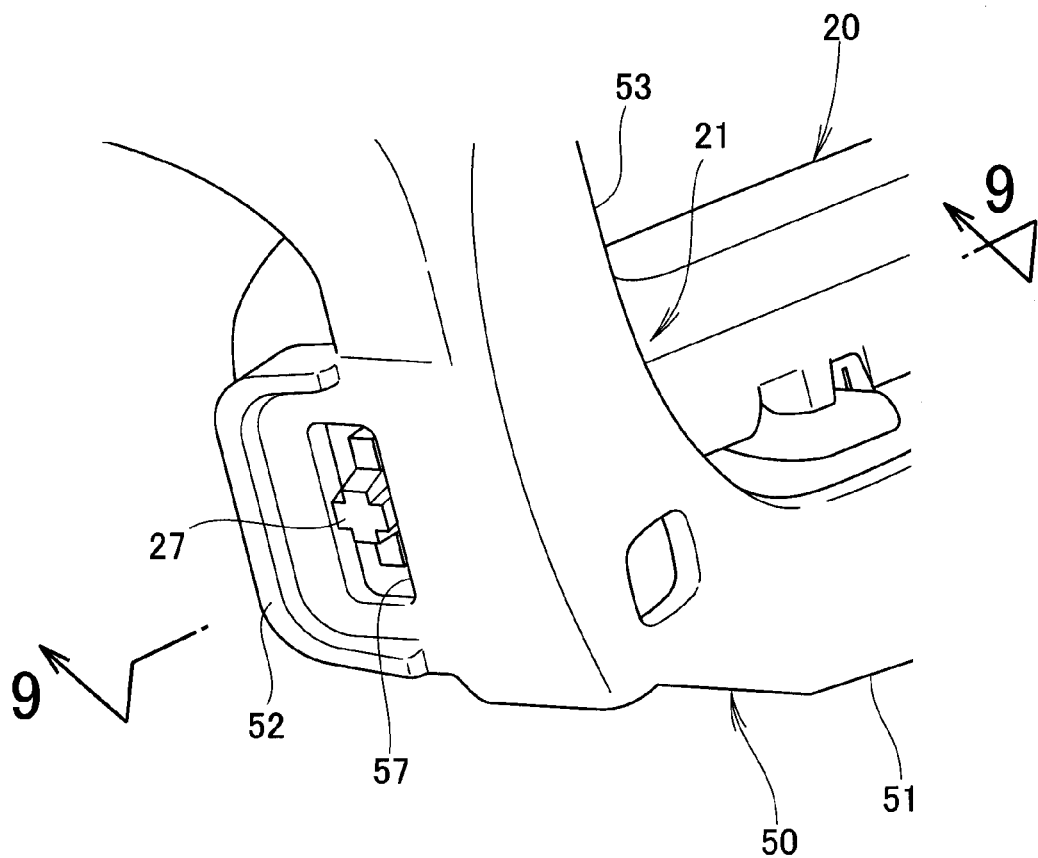

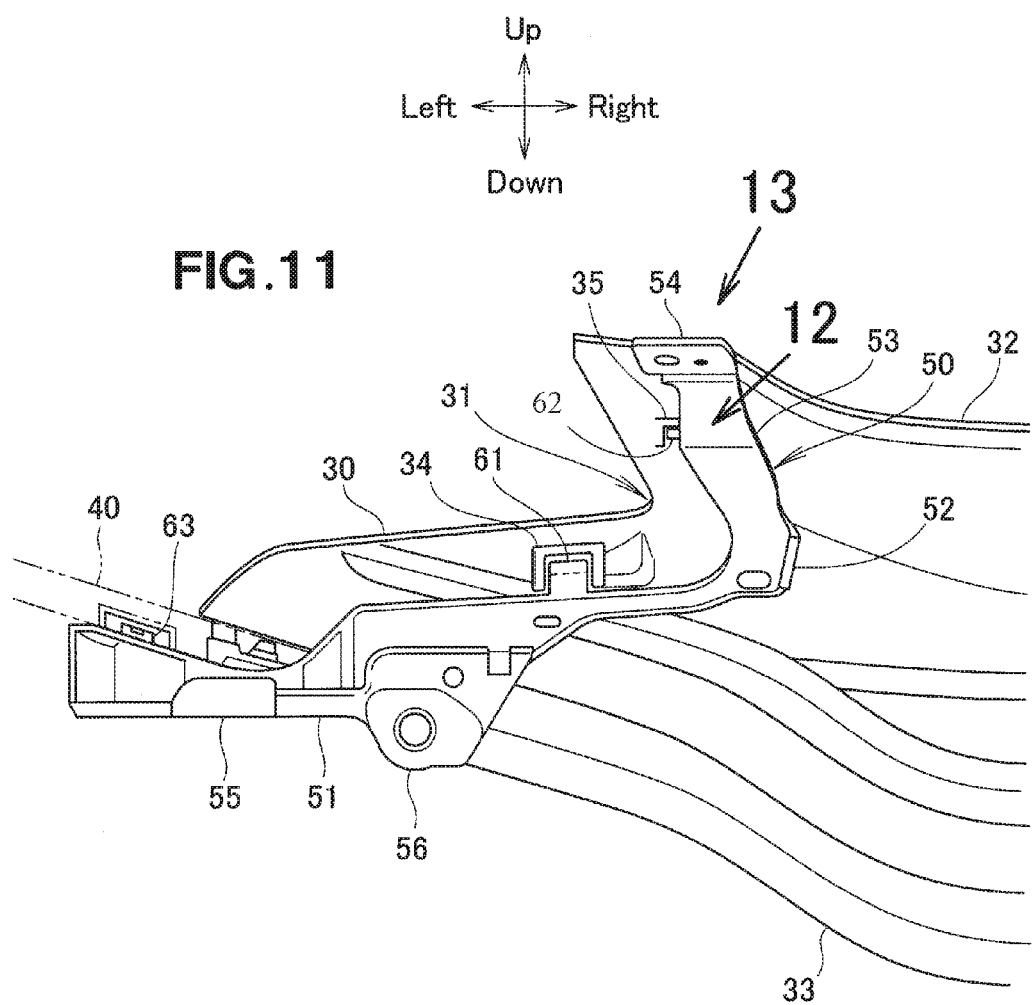

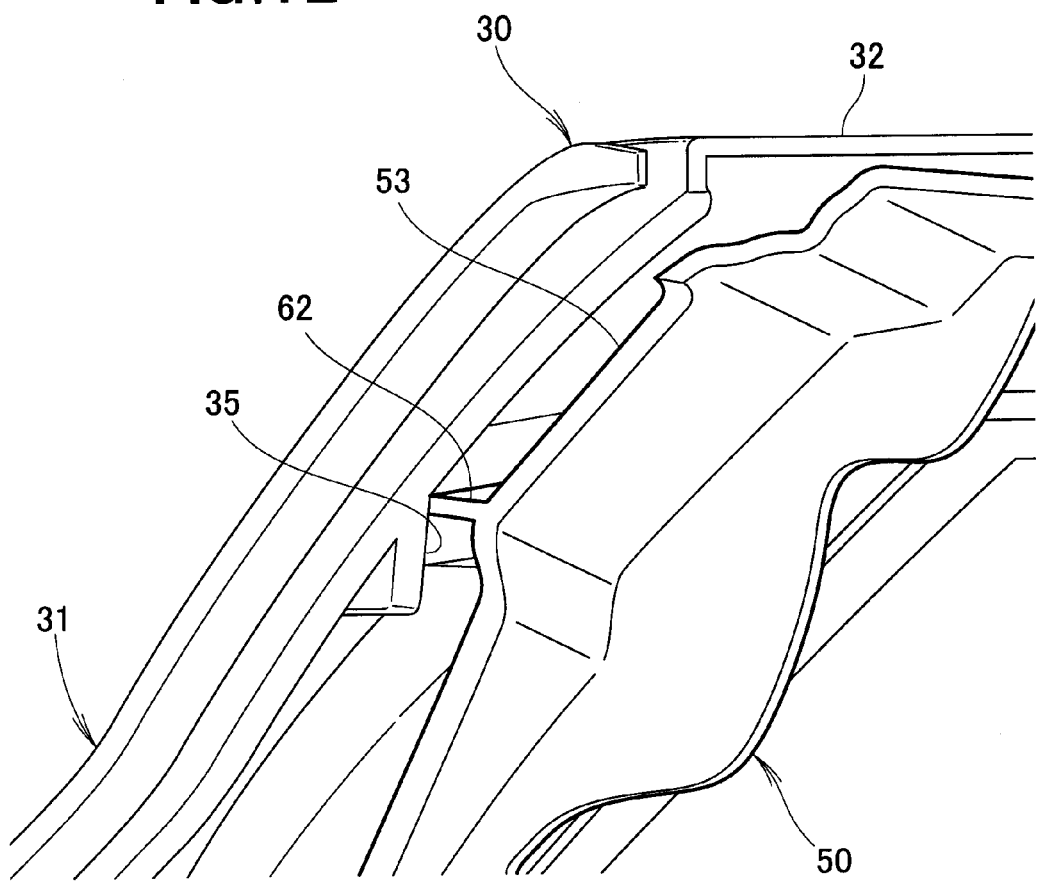

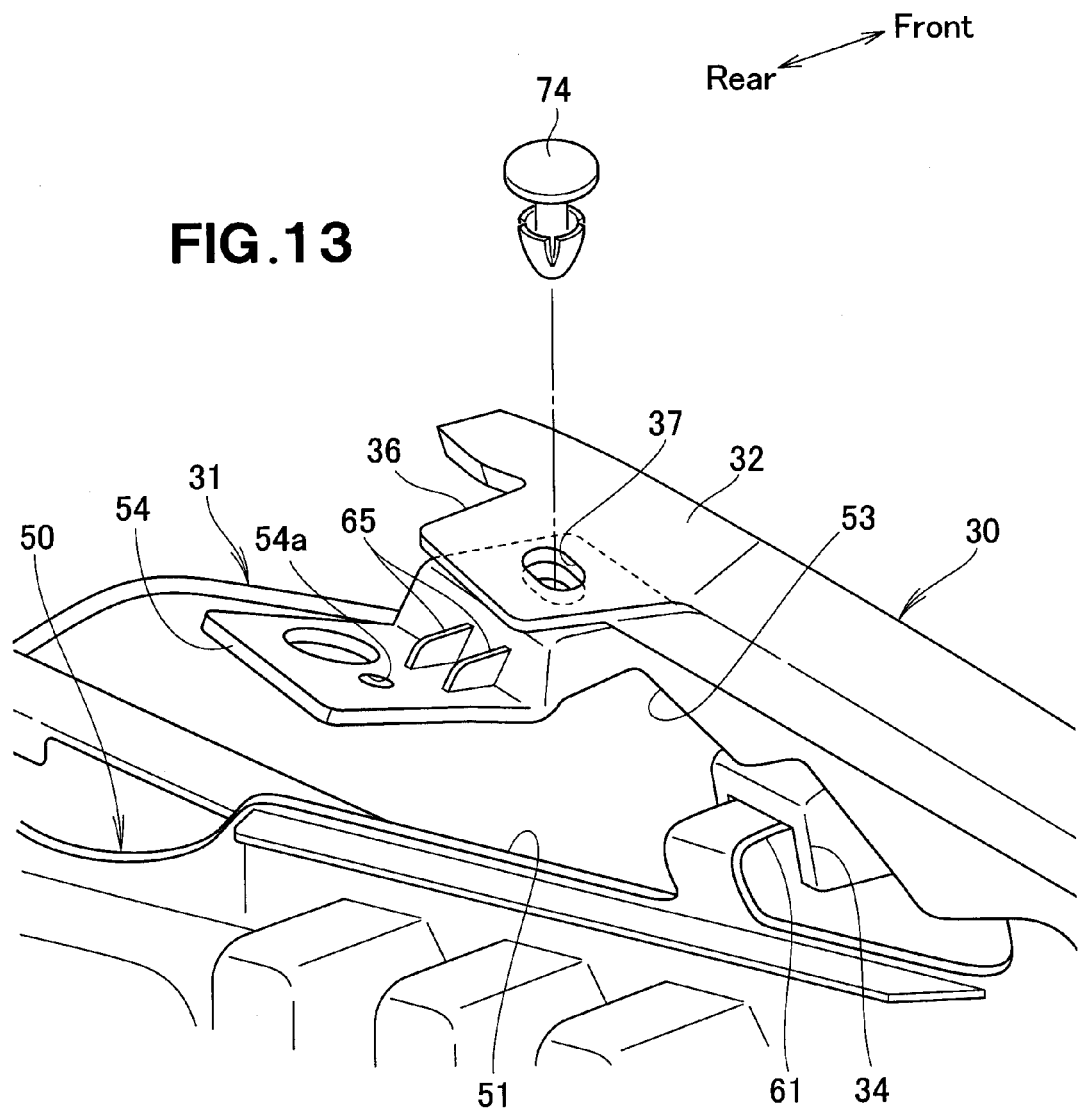

HEADLIGHT-AFFIXING STRUCTURE

TECHNICAL FIELD

The present invention relates to an improvement in a vehicle body front part structure for affixing a headlamp.

BACKGROUND ART

For example, a headlamp that illuminates ahead of a vehicle and a front bumper that absorbs impact upon collision are arranged on a front of a vehicle body of the vehicle such as a motor vehicle. Each of Patent Literature 1 and Patent Literature 2 discloses a structure that affixes the above headlamp and front bumper.

The headlamp-affixing structure disclosed in Patent Literature 1 includes a headlamp affixed to a vehicle body with a stay and a front bumper affixed to the vehicle body with an upper beam below the headlamp. Improving mounting accuracy between the headlamp and the front bumper can arrange a gap between the headlamp and the front bumper small. As a result, appearance of the vehicle improves.

The headlamp-affixing structure disclosed in Patent Literature 2 includes a front upper beam bracket arranged ahead of a front bulkhead on the inward side in a vehicle-widthwise direction of a headlamp. Upon a head-on minor collision of a vehicle, the front upper beam bracket is deformed so as to absorb collision energy. Thus, deformation of the front bulkhead can be inhibited.

However, in order to improve mounting accuracy between the headlamp and a front bumper and absorb the energy upon the collision, components are separately used other than a component for affixing the headlamp. Therefore, the number of components increases. In order to affix the headlamp and the front bumper, the number of, for example, stays and brackets increases so that the structure becomes complicated. Thus, it is difficult to satisfy the mounting accuracy and impact absorbency, simultaneously.

PRIOR ART LITERATURE

Patent Literature

Patent Literature 1: JP 2007-90916 A
Patent Literature 2: JP 2012-62017 A

SUMMARY OF INVENTION

Technical Problem

An object of the present invention is to provide a technique in which a simple structure improves mounting accuracy between a headlamp and a peripheral component and impact absorbency upon vehicular collision can be also satisfied.

Solution to Problem

According to an aspect of the present invention, there is provided a headlamp-affixing structure in which a headlamp bracket affixes a headlamp positioned above a front bumper to a vehicle body. The headlamp bracket includes a horizontal section protruding along a lower edge of the headlamp in a vehicle-widthwise direction and an upright section protruding upward from an end on the inside in the vehicle-widthwise direction of the horizontal section, and is formed in a substantially L-shape when viewed from the front. The upright section includes an upper affixing part for affixing an upper section of the headlamp with a downward-facing fastening member. The horizontal section includes a lower affixing part for affixing a lower section of the headlamp with an upward-facing fastening member.

In the invention, preferably, the upper affixing part and the upper section of the headlamp are fastened together with the downward-facing fastening member so as to be affixed to the vehicle body.

In the invention, preferably, the end on the inside in the vehicle-widthwise direction of the horizontal section includes an opening formed in the vehicle-widthwise direction. A protruding part is arranged at a position corresponding to the opening, on a side surface on the inside in the vehicle-widthwise direction of the headlamp. The protruding part protrudes to the inward side in the vehicle-widthwise direction so as to engage with the opening.

In the invention, preferably, a front grille locking part for locking a front grille is arranged on each of a part on the inside in the vehicle-widthwise direction of the lower affixing part and the upright section in the horizontal section.

In the invention, preferably, a front bumper locking part for locking a front bumper, is arranged on the headlamp bracket.

In the invention, preferably, a front surface of the protruding part is formed on a slant surface that slants to a backward side of the vehicle body from a base end to a top end of the protruding part.

In the invention, preferably, the headlamp includes an upper affixing contact part placed on and affixed to the upper affixing part, an upper positioning pin protruding from the upper affixing contact part to the upper affixing part, a lower affixing contact part placed on and affixed to the lower affixing part, and a lower positioning pin protruding from the lower affixing contact part to the lower affixing part. An upper positioning hole into which the upper positioning pin is inserted, is arranged on the upper affixing part. A lower positioning pin into which the lower positioning pin is inserted, is arranged on the lower affixing part.

Advantageous Effects of Invention

In the invention, the headlamp bracket includes the horizontal section that protrudes along the lower edge of the headlamp in the vehicle-widthwise direction and the upright section that protrudes upward from the end on the inside in the vehicle-widthwise direction of the horizontal section, and is formed into a substantially L-shape when viewed from the front. The upright section includes the upper affixing part for affixing the upper section of the headlamp. The horizontal section includes the lower affixing part for affixing the lower section of the headlamp. The headlamp is interposed from the upper side and the lower side so as to be affixed. Therefore, mounting accuracy of the headlamp to the headlamp bracket can be improved. Since the mounting accuracy of the headlamp to the headlamp bracket improves, the headlamp and the headlamp bracket can be integrally handled and affixed to a vehicle body. Since the headlamp bracket is formed in one L-shape, the configuration can be simple.

In the invention, the upper affixing part and the upper section of the headlamp are fastened together with the downward-facing fastening member so as to be affixed to the vehicle body. The fastening member for affixing the headlamp and the headlamp bracket to the vehicle body is shared. Therefore, the number of components can be reduced and component cost can be reduced. Reducing the number of components can decrease a weight of the components around the headlamp.

In the invention, the end on the inside in the vehicle-widthwise direction of the horizontal section includes an opening formed in the vehicle-widthwise direction. The protruding part is arranged at a position corresponding to the opening, on a side surface on the inside in the vehicle-widthwise direction of the headlamp. The protruding part protrudes to an inward side in the vehicle-widthwise direction so as to engage with the opening. Therefore, a third affixing point can be formed at a part away from the upper affixing part and the lower affixing part. The headlamp is affixed to the headlamp bracket by three points. Therefore, mounting accuracy can be improved and mounting rigidity of the headlamp to the headlamp bracket can be also improved.

In the invention, the front grille locking part is arranged on each of a part on the inside in the vehicle-widthwise direction of the lower affixing part and the upright section in the horizontal section. The headlamp bracket also serves as a bracket for locking the front grille. Therefore, the number of components can be reduced. The affixing points between the headlamp and the front grille are gathered to the headlamp bracket. Therefore, mutual positioning accuracy can be improved. The headlamp bracket is shared so that the components are mutually reinforced. Therefore, mounting rigidity of the headlamp and the front grille with respect to the vehicle body improves.

In the invention, the front bumper locking part for locking a front bumper, is arranged on the headlamp bracket. The headlamp bracket also serves as a bracket for locking the front bumper. Therefore, the number of components can be reduced. The affixing points between the headlamp and the front bumper are gathered to the headlamp bracket. Therefore, mutual positioning accuracy can be improved. The headlamp bracket is shared so that the components are mutually reinforced. Therefore, mounting rigidity of the headlamp and the front bumper with respect to the vehicle body improves.

In the invention, the front surface of the protruding part is formed on the slant surface that slants to the backward side of the vehicle body from the base end to the top end of the protruding part. A collision load is input into the headlamp bracket through the front bumper and the front grille upon a head-on minor collision of a vehicle. The engaging part of the headlamp bracket that has received the collision load slides due to the slant surface so as to release the engagement with the headlamp. Therefore, damage of the headlamp can be prevented.

In the invention, the headlamp includes the upper positioning pin and the lower positioning pin. The upper positioning hole into which the upper positioning pin is inserted, is arranged on the upper affixing part. The lower positioning hole into which the lower positioning pin is inserted, is arranged on the lower affixing part. Therefore, positioning of the headlamp with respect to the headlamp bracket can be easily performed. The upper positioning pin and the lower positioning pin are caught to the headlamp bracket so that the headlamp bracket can be prevented from falling from the headlamp when assembled. Assembly of the headlamp and the headlamp bracket to the vehicle body can be improved.

BRIEF DESCRIPTION OF DRAWINGS

FIG. 8 is a view as seen in the direction of arrow 8 of FIG. 7.

FIG. 11 is a rear view illustrating the headlamp bracket and a front grille according to the present invention;

FIG. 12 is a view as seen in the direction of arrow 12 of FIG. 11; and

FIG. 13 is a view as seen in the direction of arrow 13 of FIG. 11.

DESCRIPTION OF EMBODIMENTS

An embodiment of the present invention will be described based on the attached drawings.

Embodiment

A front of a vehicle body of a motor vehicle according to the embodiment will be described. Note that, for convenience, the left side of the front of a vehicle body will be described. The right side of the front of a vehicle body has a structure that has bilateral symmetry and is similar to that on the left side.

Figure 1:
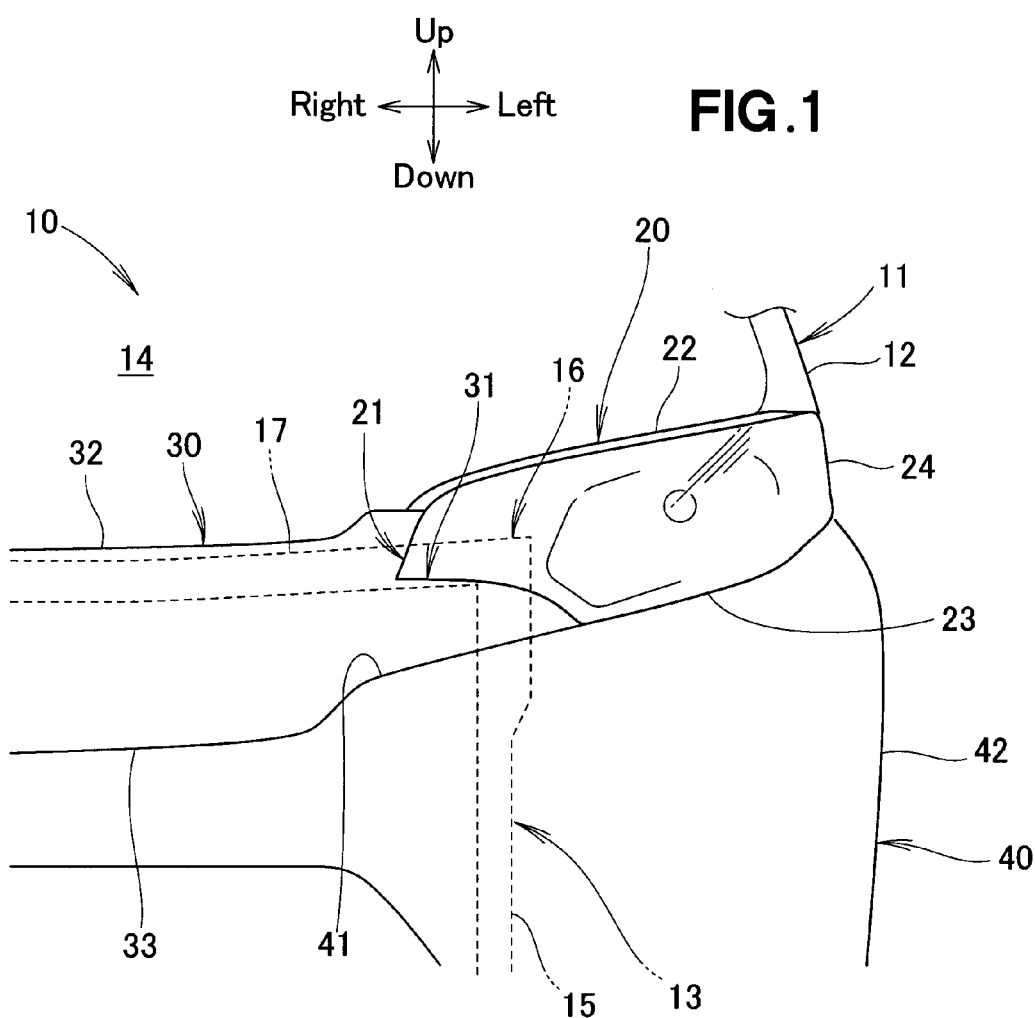
FIG. 1 is a front elevational view illustrating a vehicle body front part according to the present invention.

As illustrated in FIG. 1, a vehicle 10 is, for example, a passenger vehicle. A vehicle body 11 includes a monocoque body, and is formed so as to have substantially bilateral symmetry with respect to the center in a vehicle-widthwise direction of the vehicle 10. The front of the vehicle body 11 includes an upper member 12 and a front bulkhead 13. An engine room 14 is formed behind the front bulkhead 13.

The front bulkhead 13 includes a side member 15 that is positioned on the inside in the vehicle-widthwise direction of the upper member 12 and protrudes upward and downward, and an upper cross member 17 that protrudes from a corner section 16 of an upper end of the side member 15 to the inside in the vehicle-widthwise direction.

A headlamp 20 is arranged at the corner section 16 of the front bulkhead 13 so as to protrude to the outside in the vehicle-widthwise direction. A front grille 30 is arranged on the inside of the headlamp 20. A front bumper 40 is arranged on a lower end of the front grille 30 and a lower end of the headlamp.

The headlamp 20 is positioned above the front bumper 40. When viewed from the front, the headlamp 20 includes a V-shaped protruding part 21 formed to be V-shaped at an inner end, an upper edge 22 formed so as to protrude outward from an upper end part of the V-shaped protruding part 21, a lower edge 23 formed so as to protrude outward from a lower end part of the V-shaped protruding part 21, and an outer side part 24 formed so as to couple an outer end of the lower edge 23 and an outer end of the upper edge 22 and protrude upward and downward.

The front grille 30 includes a V-shaped recess part 31 formed so as to correspond to the V-shaped protruding part 21 of the headlamp 20, a grille upper side part 32 formed so as to protrude inward from an upper end part of the V-shaped recess part 31, and a grille lower side part 33 formed so as to protrude inward from a lower end part of the V-shaped recess part 31.

The front bumper 40 includes a bumper upper side part 41 formed along the lower edge 23 of the headlamp 20 and the grille lower side part 33, and a bumper outer side part 42 formed so as to protrude downward from an outer end part of the bumper upper side part 41.

Figure 2:
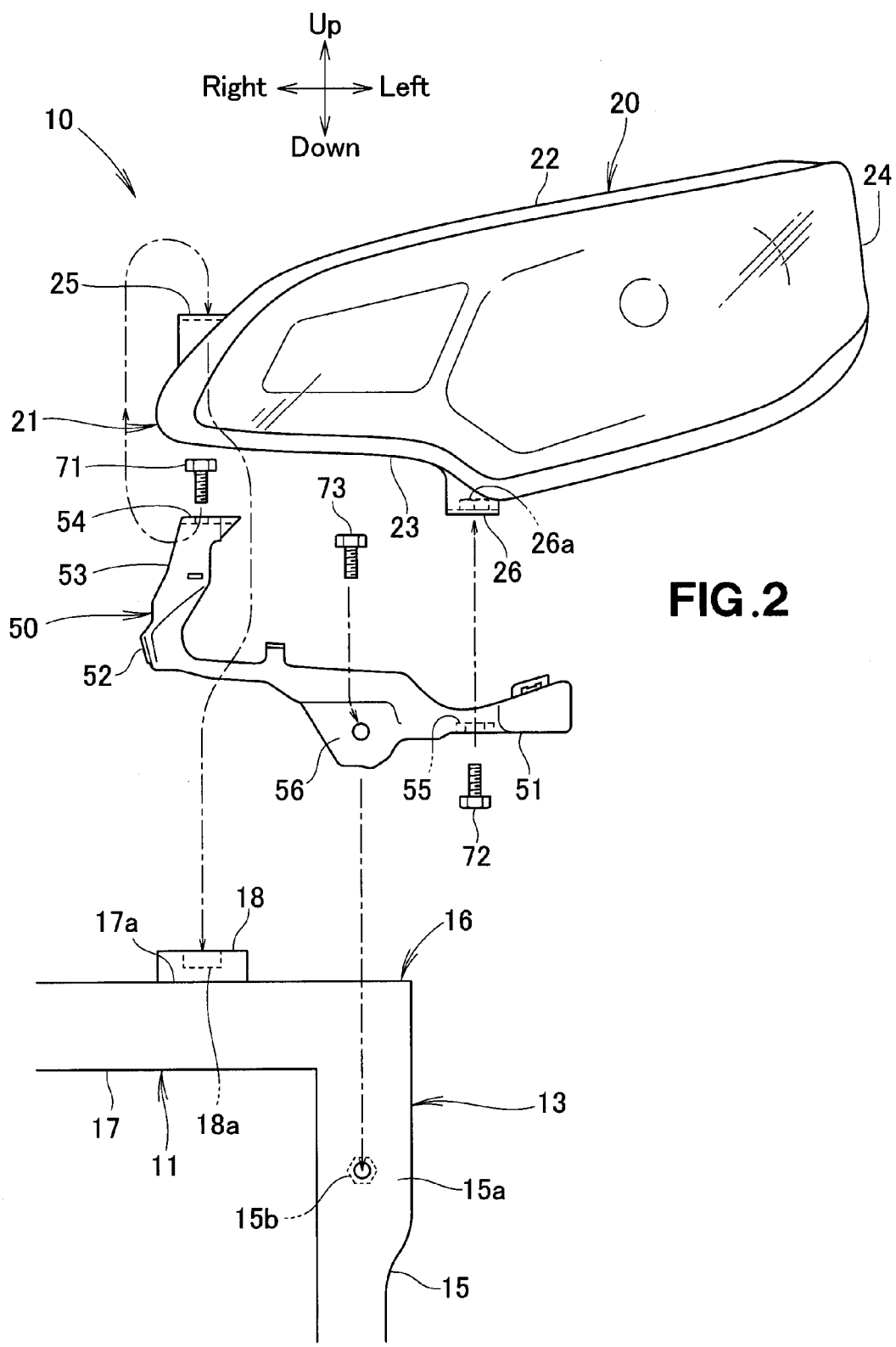
FIG. 2 is an exploded view illustrating a main part of the vehicle body front part according to the present invention.
Figure 3:
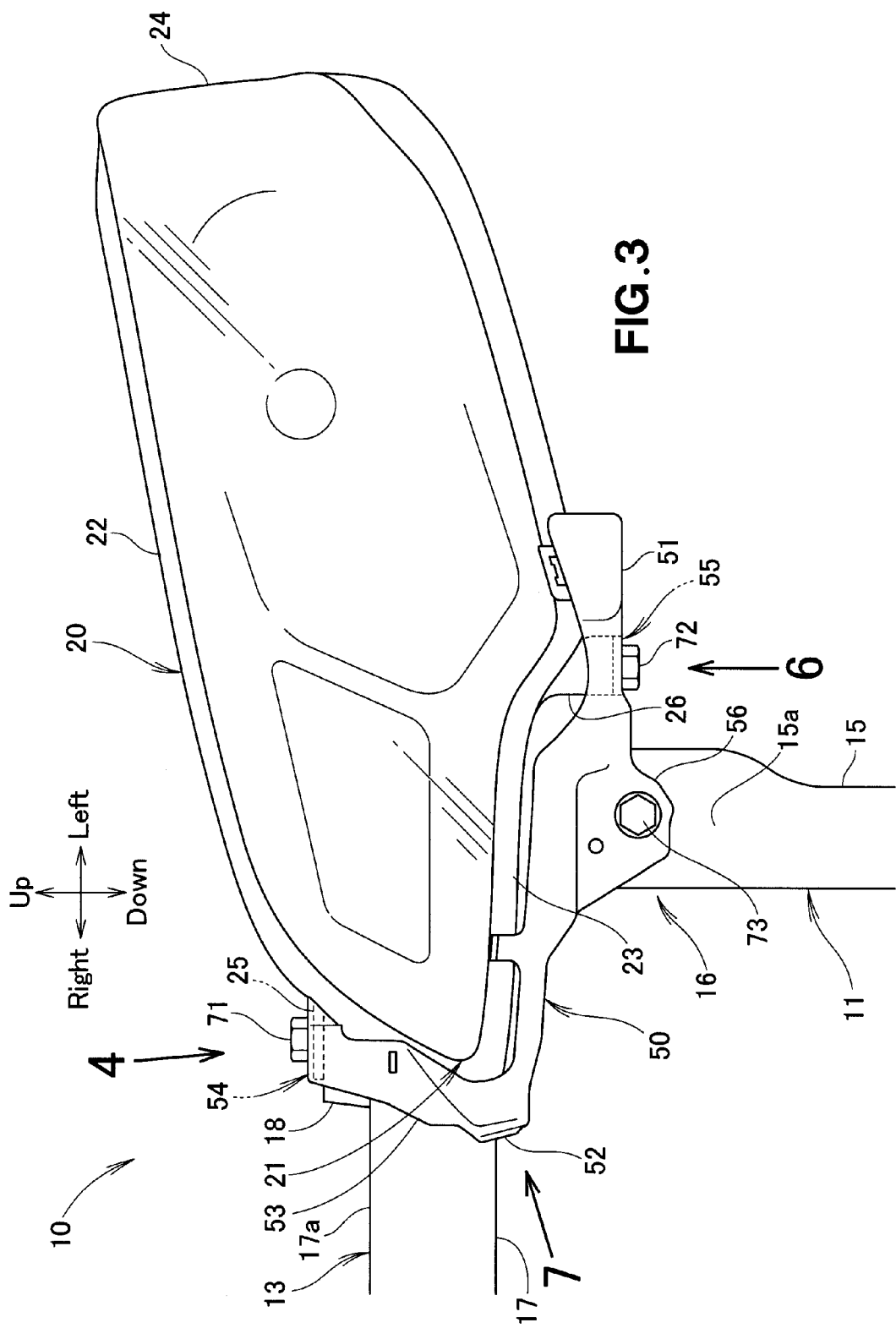
FIG. 3 is a front elevational view illustrating a periphery of a headlamp of FIG. 2.

As illustrated in FIGS. 2 and 3, the headlamp 20 is affixed to the front bulkhead 13 of the vehicle body 11 with a headlamp bracket 50. In the headlamp 20, the lower side part of the V-shaped protruding part 21 substantially horizontally protrudes so as to continue to the lower edge 23. The upper side part of the V-shaped protruding part 21 protrudes outward so as to slightly slant upward.

The headlamp bracket 50 includes a horizontal section 51 protruding along the lower edge 23 of the headlamp 20 in the vehicle-widthwise direction and an upright section 53 protruding upward from an end 52 on the inside in the vehicle-widthwise direction of the horizontal section 51. The headlamp bracket 50 is formed in a substantially L-shape when viewed from the front. The inside of the headlamp bracket 50 is formed so as to be along the V-shaped protruding part 21 of the headlamp 20, the inside being formed in the L-shape. Accordingly, the headlamp bracket 50 and the headlamp 20 can be integrally handled.

In the headlamp bracket 50, the upright section 53 includes an upper affixing part 54 for affixing an upper section 25 of the headlamp 20 with a downward-facing fastening member 71. A middle-outside section of the horizontal section 51 includes a lower affixing part 55 for affixing a lower section 26 of the headlamp 20 with an upward-facing fastening member 72. A front-middle section of the horizontal section 51 includes a lower bracket affixing part 56 for affixing the horizontal section 51 of the headlamp bracket 50 to the side member 15 with a vehicle-backward-facing fastening member 73.

In the front bulkhead 13, a stay 18 for affixing the upper affixing part 54, is arranged on an upper surface 17a of the upper cross member 17. A weld nut 18a is arranged on the stay 18. The downward-facing fastening member 71 is fastened to the weld nut 18a.

In the front bulkhead 13, a weld nut 15b is arranged in the side member 15, the weld nut 15b fastening the vehicle-backward-facing fastening member 73 after the lower bracket affixing part 56 abuts on a front surface 15a of the side member 15.

In the headlamp 20, a nut 26a is arranged in the lower section 26. The upward-facing fastening member 72 is fastened to the nut 26a. As described above, the headlamp 20 is interposed from the upper side and the lower side so as to be affixed. Mounting accuracy of the headlamp 20 to the headlamp bracket 50 can be improved. Since the mounting accuracy of the headlamp 20 to the headlamp bracket 50 improves, the headlamp 20 and the headlamp bracket 50 can be integrally handled and affixed to the vehicle body 11.

Figure 4:
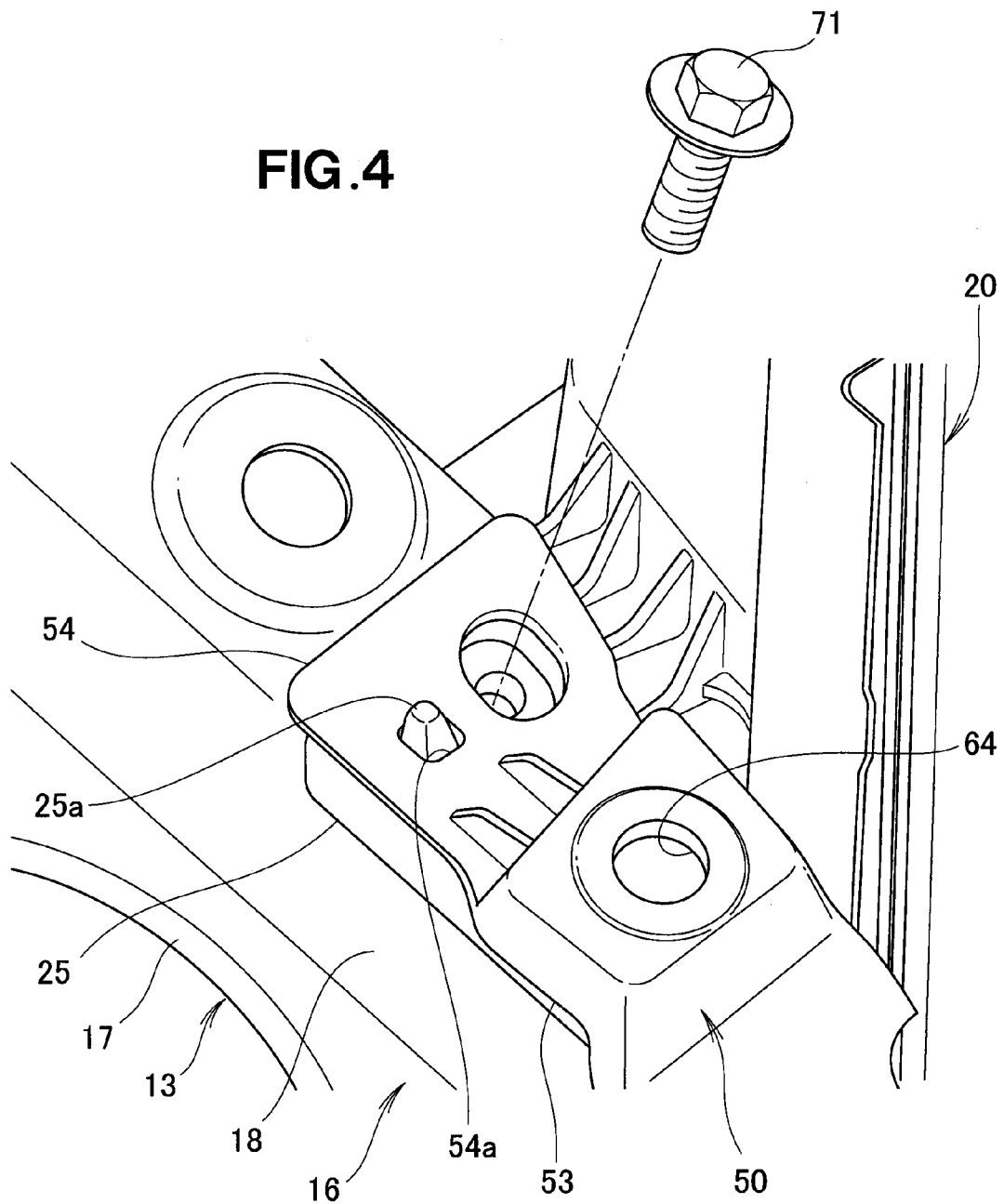
FIG. 4 is a view as seen in the direction of arrow 4 of FIG. 3.
Figure 5:
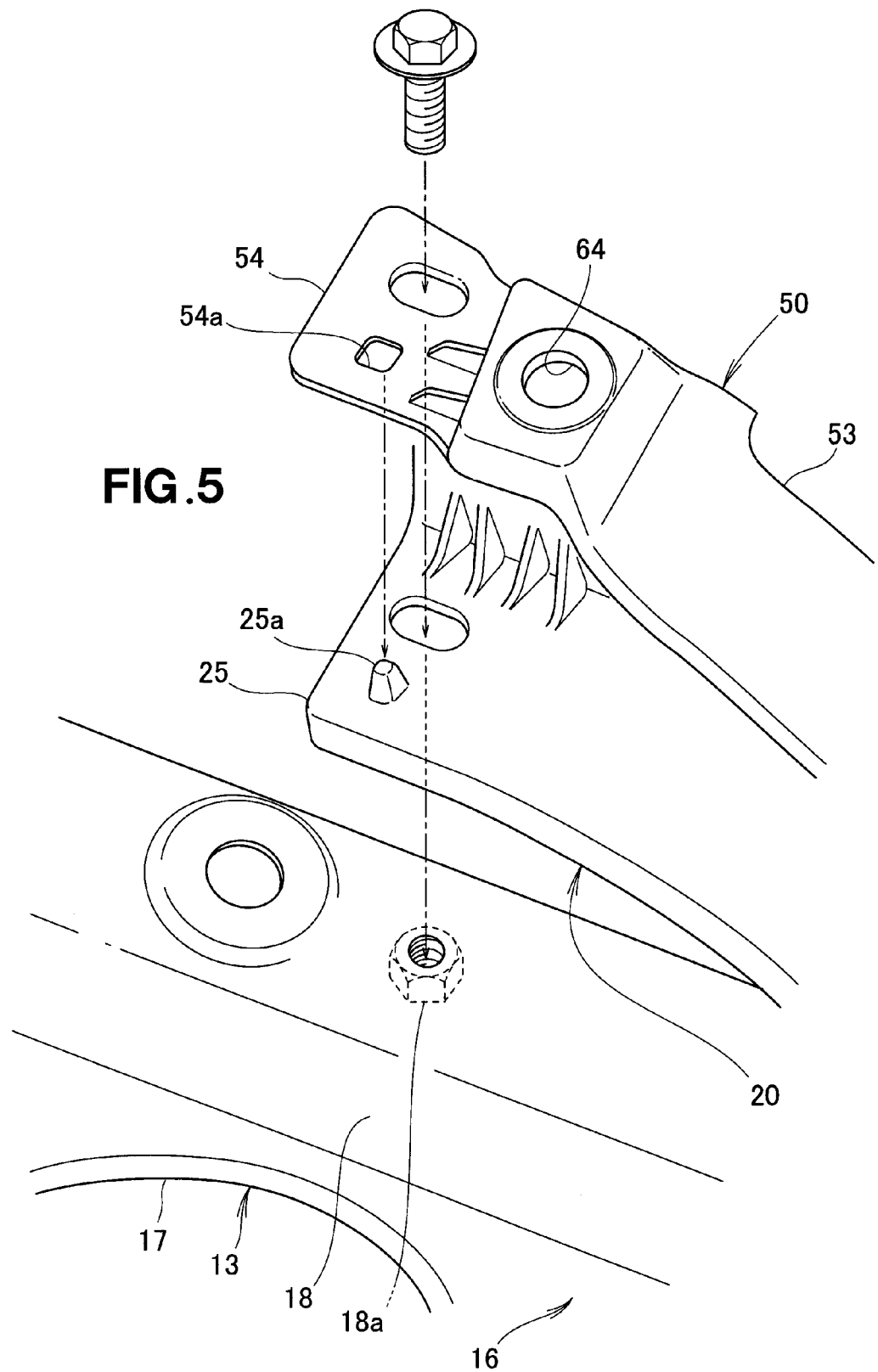
FIG. 5 is an exploded perspective view illustrating the periphery of an upper affixing part of FIG. 4.

As illustrated in FIGS. 4 and 5, the upper section 25 of the headlamp 20 and the upper affixing part 54 of the headlamp bracket 50 are placed on the stay 18 in this order. The upper affixing part 54 and the upper section 25 of the headlamp 20 are fastened together with the downward-facing fastening member 71 so as to be affixed to the front bulkhead 13.

The upper section 25 of the headlamp 20 is an upper affixing contact part 25. The upper affixing contact part 25 includes an upper positioning pin 25a that protrudes toward the upper affixing part 54 of the headlamp bracket 50, and is placed on the upper affixing part 54. An upper positioning hole 54a into which the upper positioning pin 25a is inserted, is arranged on the upper affixing part 54. As a result, positioning is easily performed.

The lower bracket affixing part 56 is arranged between the end 52 of the headlamp bracket 50 and the lower affixing part 55. In the vehicle-widthwise direction, the lower affixing part 55 is arranged in the vicinity of an outer end in the vehicle-widthwise direction of the headlamp bracket 50. The upper affixing part 54 is arranged in the vicinity of an inner end in the vehicle-widthwise direction of the headlamp bracket 50. Accordingly, the headlamp 20 can be supported by using the entire headlamp bracket 50 in the vehicle-widthwise direction. The headlamp 20 can be securely supported in the vehicle-widthwise direction in addition to in a perpendicular direction. Mounting accuracy of the headlamp to the headlamp bracket 50 can be improved.

Figure 6:
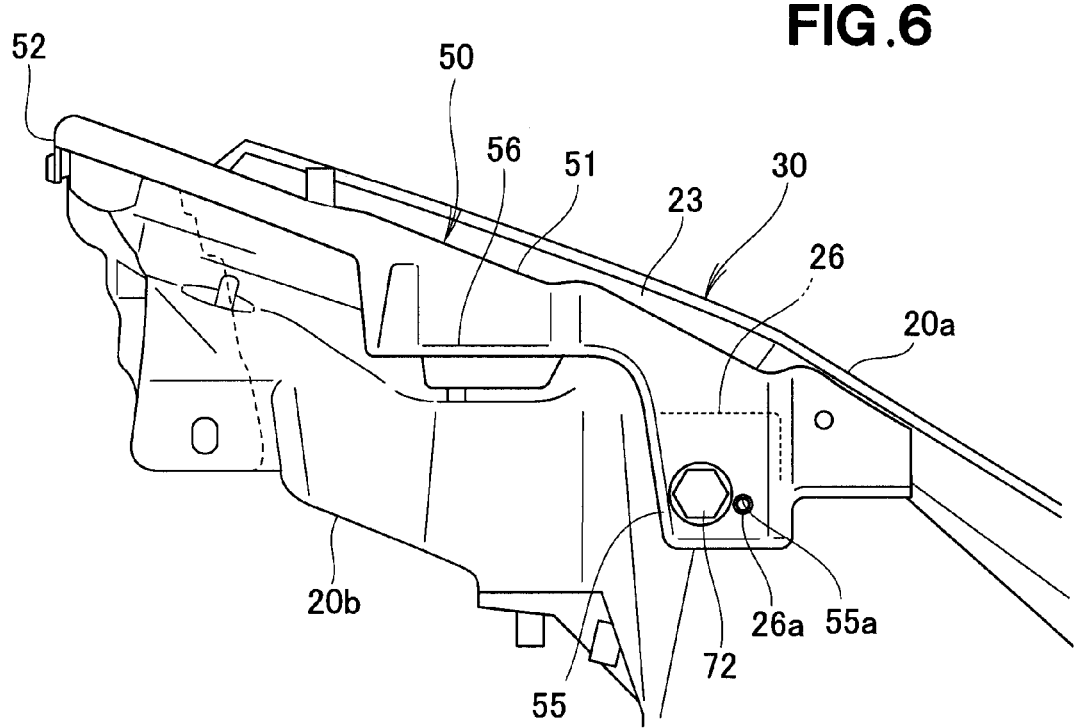
FIG. 6 is a view as seen in the direction of arrow 6 of FIG. 3.

As illustrated in FIGS. 3 and 6, the lower section 26 of the headlamp 20 is a lower affixing contact part 26. The lower affixing contact part 26 includes a lower positioning pin 26a that protrudes toward the lower affixing part 55 of the headlamp bracket 50, and is placed on the lower affixing part 55. A lower positioning hole 55a into which the lower positioning pin 26a is inserted, is arranged on the lower affixing part 55. As a result, positioning can be easily performed.

The headlamp bracket 50 protrudes from the end 52 to the outside in a left direction so as to slant backward. A lens 20a of the headlamp 20 is formed from an inner end to the outside in the left direction so as to slant backward. As a result, when viewed from the bottom, the headlamp bracket 50 can be arranged along the lens 20a of the headlamp 20. The headlamp bracket 50 and the headlamp 20 can be integrally handled. Note that, the headlamp 20 includes the lens 20a and a housing 20b behind the lens 20a.

Figure 7:
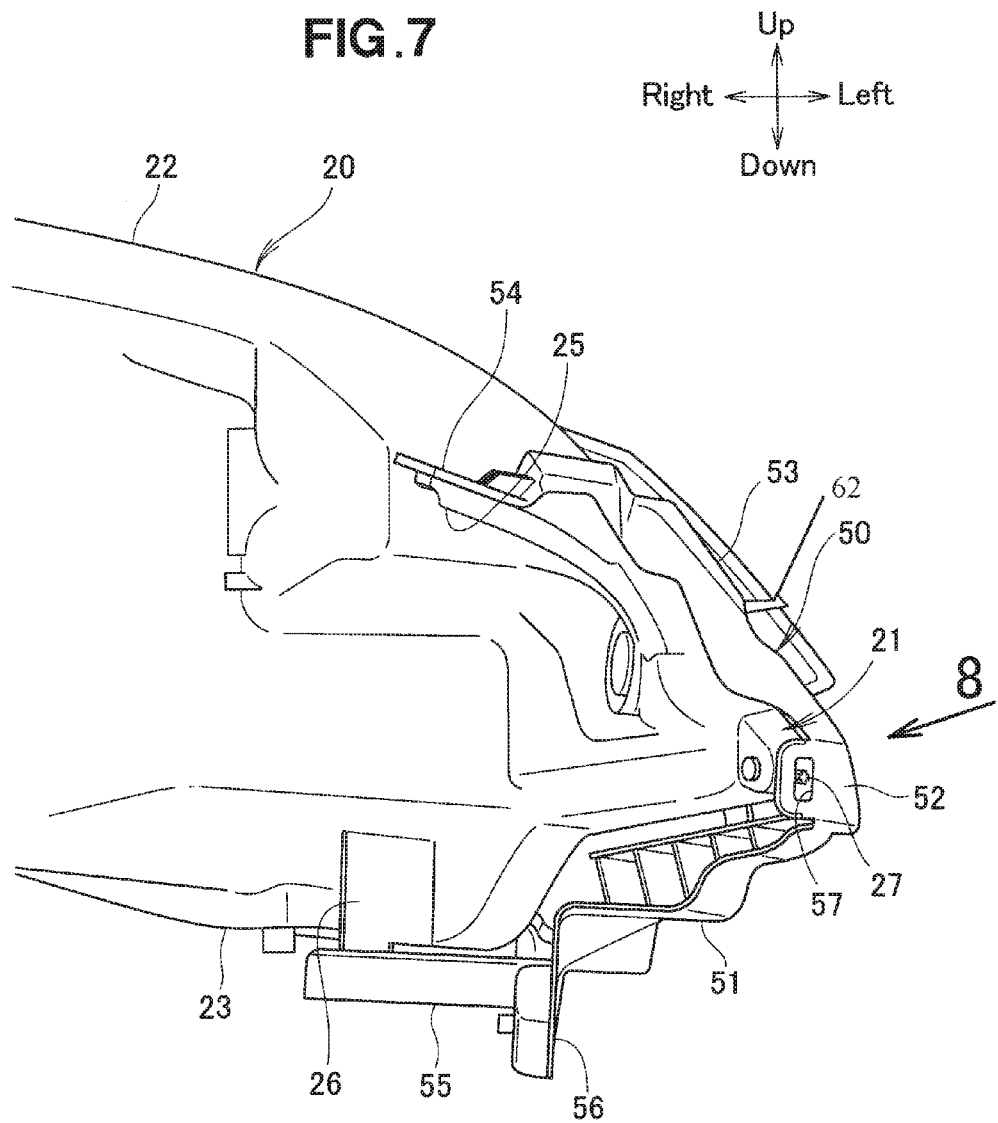
FIG. 7 is a view as seen in the direction of arrow 7 of FIG. 3.

As illustrated in FIGS. 7 and 8, the headlamp bracket 50 includes an opening 57 that opens in the vehicle-widthwise direction, formed at the end 52 on the inside in the vehicle-widthwise direction of the horizontal section 51. The opening 57 is formed so as to be long in a vertical direction. A protruding part 27 is arranged on a side surface on the inside in the vehicle-widthwise direction of the headlamp 20 so as to be at a position corresponding to the opening 57. The protruding part 27 protrudes in the vehicle-widthwise direction so as to engage with the opening 57.

In a vehicle longitudinal direction, a breadth of the opening 57 is formed so as to be slightly larger than a width of the protruding part 27. However, a gap is small. Accordingly, backlash in the longitudinal direction can be prevented. In the vertical direction, a length of the opening 57 is formed so as to be larger than the width of the protruding part 27. A gap is larger than the gap in the vehicle longitudinal direction. Accordingly, the protruding part 27 can easily engage with the opening 57 when assembled.

Figure 9:
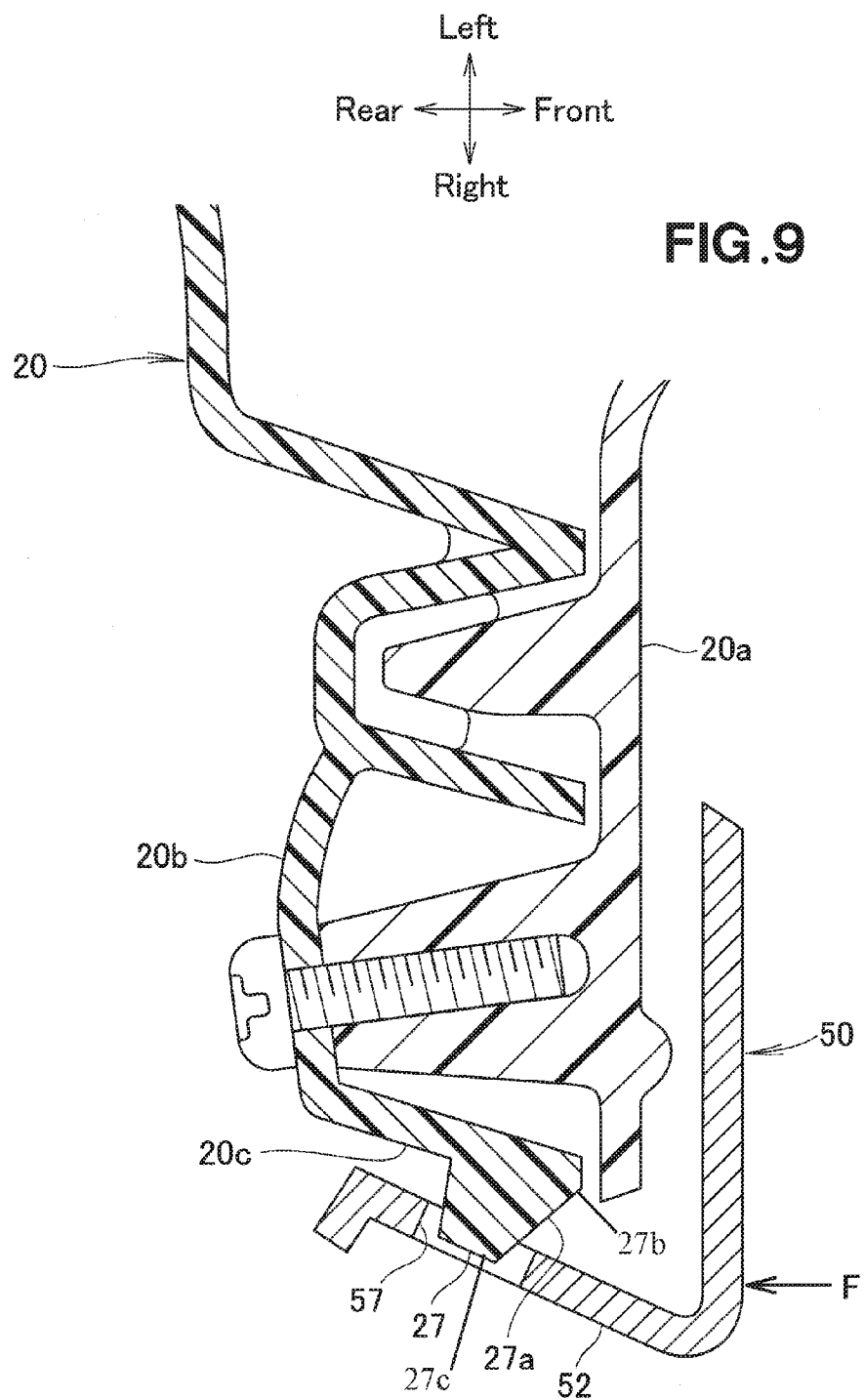
FIG. 9 is a cross-sectional view taken along line 9-9 of FIG. 8.

As illustrated in FIG. 9, the protruding part 27 is arranged on a wall surface 20c of the housing 20b. A front surface 27a of the protruding part 27 is formed on a slant surface 27a that slants to the backward side of the vehicle body from a base end 27b to a top (free) end 27c of the protruding part 27.

A collision load F is input into the headlamp bracket 50 through the front bumper 40 (refer to FIG. 1) and the front grille 30 (refer to FIG. 1) upon a head-on minor collision of the vehicle. An engaging part (opening 57) of the headlamp bracket 50 that has received the collision load F, slides due to the slant surface 27*a* so as to release the engagement with the headlamp 20. Therefore, damage of the headlamp 20 can be prevented.

Figure 10:
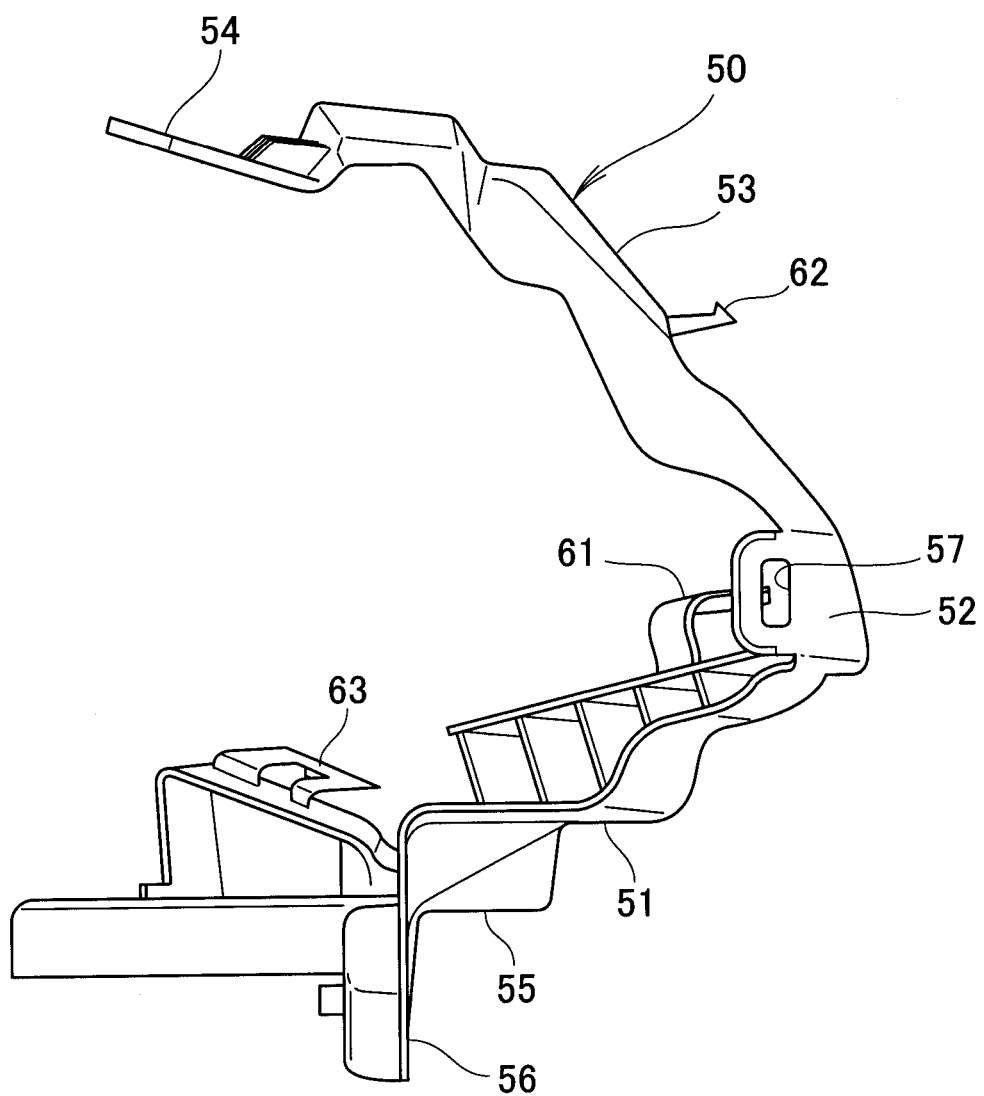
FIG. 10 is a left side view illustrating a headlamp bracket according to the present invention.

As illustrated in FIGS. 10 to 12, in the headlamp bracket 50, a first front grille locking part 61 for locking the front grille 30 is arranged at a part on the inside in the vehicle-widthwise direction of the lower affixing part 55 in the horizontal section 51. The first front grille locking part 61 is formed in a substantially L-shape so as to rise from the horizontal section 51 and protrude forward from an upper end of the rise when viewed from the side. Since the shape is simple, the first front grille locking part 61 can be easily formed. In the front grille 30, a first receiving part 34 is formed at a position corresponding to the first front grille locking part 61.

In the headlamp bracket 50, a second front grille locking part 62 for locking the front grille 30 is arranged at a middle part of the upright section 53. The second front grille locking part 62 is a claw formed so as to protrude forward from a front surface of the upright section 53 when viewed from the side. Since the shape is simple, the second front grille locking part 62 can be easily formed. In the front grille 30, a second receiving part 35 is formed at a position corresponding to the second front grille locking part 62.

The V-shaped recess part 31 of the front grille 30 has rigidity lower than a part formed so as to be linear. Locking upper and lower parts of the V-shaped recess part 31 at the front grille bracket 50 can reinforce the V-shaped recess part 31.

In the headlamp bracket 50, a front bumper locking part 63 for locking the front bumper 40 is arranged at an outer end part of the horizontal section 51. The front bumper locking part 63 is formed in a substantially L-shape so as to rise from the horizontal section 51 and protrude forward from an upper end of the rise when viewed from the side. Since the shape is simple, the front bumper locking part 63 can be easily formed. In the front bumper 40, a receiving part (not illustrated) is formed at a position corresponding to the front bumper locking part 63.

As illustrated in FIGS. 4 and 13, a protruding flange 36 that protrudes to the backward side of the vehicle, is arranged at a position corresponding to the upper affixing part 54 of the headlamp bracket 50, on the grille upper side part 32 of the front grille 30. A grille-side through hole 37 is arranged in the protruding flange 36. A bracket-side through hole 64 is arranged in the upper affixing part 54 of the headlamp bracket 50. The protruding flange 36 is placed on the upper affixing part 54 and then a clip 74 is inserted into the grille-side through hole 37 and the bracket-side through hole 64. Thus, the protruding flange 36 can be affixed to the upper affixing part 54.

A rib 65 reinforces the upper affixing part 54. The upper affixing part is a part for affixing the headlamp 50 and the front grille 30. The rib 65 can improve rigidity of the upper affixing part 54.

Operation of the above headlamp-affixing structure that has been described, will be described next.

As illustrated FIGS. 1, 3, and 11, the headlamp 20, the front grille 30, and the front bumper 40 share the headlamp bracket 50 so that the components are mutually reinforced. Thus, the mounting rigidity of the headlamp 20, the front grille 30, and the front bumper 40 with respect to the vehicle body 11 improves.

The headlamp-affixing structure that has been described, will be summarized and described below.

As illustrated in FIGS. 1 to 3, the headlamp bracket 50 includes the horizontal section 51 protruding along the lower edge 23 of the headlamp 20 in the vehicle-widthwise direction and the upright section 53 protruding upward from the end 52 of the inside in the vehicle-widthwise of the horizontal section 51. The headlamp bracket 50 is formed in the substantially L-shape when viewed from the front. The upright section 53 includes the upper affixing part 54 for affixing the upper section 25 of the headlamp 20. The horizontal section 51 includes the lower affixing part 55 for affixing the lower section 26 of the headlamp 20. Since the headlamp 20 is interposed from the upper side and the lower side so as to be affixed. The mounting accuracy of the headlamp 20 to the headlamp bracket 50 can be improved.

Since the mounting accuracy of the headlamp 20 to the headlamp bracket 50 improves, the headlamp 20 and the headlamp bracket 50 can be integrally handled and affixed to the vehicle body 11. The headlamp bracket 50 is formed in one L-shape. Therefore, the configuration can be simple.

As illustrated in FIG. 2, the upper affixing part 54 and the upper section 25 of the headlamp 20 are fastened together with the downward-facing fastening member 71 so as to be affixed to the vehicle body 11. The fastening member 71 for affixing the headlamp 20 and the headlamp bracket 50 to the vehicle body 11, is shared. Therefore, the number of components can be reduced and the component cost can be reduced. Reducing the number of components can decrease a weight of the components around the headlamp 20.

As illustrated in FIG. 7, the protruding part 27 protrudes to the inward side in the vehicle-widthwise direction so as to engage with the opening 57. Therefore, the third affixing point can be formed at the part away from the upper affixing part 54 and the lower affixing part 55. The headlamp 20 is affixed to the headlamp bracket 50 by the three points. Therefore, the mounting accuracy can be improved and the mounting rigidity of the headlamp 20 to the headlamp bracket 50 can be also improved.

As illustrated in FIG. 11, the headlamp bracket 50 also serves as the bracket for locking the front grille 30. Therefore, the number of components can be reduced. The affixing points between the headlamp 20 (refer to FIG. 3) and the front grille 30 are gathered to the headlamp bracket 50. Therefore, the mutual positioning accuracy can be improved. The headlamp bracket 50 is shared so that the components are mutually reinforced. Therefore, the mounting rigidity of the headlamp 20 and the front grille 30 with respect to the vehicle body 11 (refer to FIG. 3) improves.

As illustrated in FIG. 11, the headlamp bracket 50 also serves as the bracket for locking the front bumper 40. Therefore, the number of components can be reduced. The affixing points between the headlamp 20 (refer to FIG. 3) and the front bumper 40 are gathered to the headlamp bracket 50. Therefore, the mutual positioning accuracy can be improved. The headlamp bracket 50 is shared so that the components are mutually reinforced. Therefore, the mounting rigidity of the headlamp 20 and the front bumper 40 with respect to the vehicle body 11 improves (refer to FIG. 3).

As illustrated in FIGS. 1 and 9, the front surface 27*a* of the protruding part 27 is formed on the slant surface 27*a* that slants to the backward side of the vehicle body from the base end 27*b* to the top (free) end 27*c* of the protruding part 27. The collision load is input into the headlamp bracket 50 through the front bumper 40 and the front grille 30 upon the head-on minor collision of the vehicle 10. The engaging part of the headlamp bracket 50 that has received the collision load, slides due to the slant surface 27*a* so as to release the engagement with the headlamp 20. Therefore, the damage of the headlamp 20 can be prevented.

As illustrated in FIGS. 4 to 6, the headlamp 20 has the upper positioning pin 25a and the lower positioning pin 26a. The upper positioning hole 54a into which the upper positioning pin 25a is inserted, is arranged on the upper affixing part 54. The lower positioning hole 55a into which the lower positioning pin 26a is inserted, is arranged on the lower affixing part 55. Therefore, the positioning of the headlamp 20 with respect to the headlamp bracket 50 can be easily performed. The upper positioning pin 25a and the lower positioning pin 26a are caught to the headlamp bracket 50 so that the headlamp bracket 50 can be prevented from falling from the headlamp 20 when assembled. The assembly of the headlamp 20 and the headlamp bracket 50 to the vehicle body 11 can be improved.

Note that, according to the embodiment, the components on the left side in the vehicle-widthwise direction have been described with the symmetry with respect to the center in the vehicle-widthwise direction. The right side in the vehicle-widthwise direction can be also described similar to the left side.

INDUSTRIAL APPLICABILITY

A headlamp-affixing structure according to the present invention is suitable to a motor vehicle having left and right headlamps.

REFERENCE SIGNS LIST 10 vehicle
11 vehicle body
13 front bulkhead
20 headlamp
23 lower edge
25 upper section (upper affixing contact part)
25a upper positioning pin
26 lower section (lower affixing contact part)
26a lower positioning pin
27 protruding part
27a slant surface (front surface)
30 front grille
40 front bumper
50 headlamp bracket
51 horizontal section
52 end
53 upright section
54a upper positioning hole
55a lower positioning hole
57 opening
61 first front grille locking part
62 second front grille locking part
63 front bumper locking part
71 downward-facing fastening member
72 upward-facing fastening member

The invention claimed is:

1. A headlamp-affixing structure in which a headlamp bracket affixes a headlamp, which is positioned above a front bumper, to a vehicle body,
   wherein the headlamp bracket includes a horizontal section that protrudes along a lower edge of the headlamp in a vehicle-widthwise direction and an upright section that protrudes upward from an inner end of the horizontal section in the vehicle-widthwise direction forming a substantially L-shape when viewed from a front side,
   wherein the headlamp bracket further includes
   an upper affixing part for affixing an upper section of the headlamp with a downward-facing fastening member, said upper fixing part being arranged on the upright section,
   a lower affixing part for affixing a lower section of the headlamp with an upward-facing fastening member, said lower fixing part being arranged on the horizontal section, and
   first and second front grille locking parts for locking a front grille, said first front grille locking part being arranged on a part of the horizontal section on an inside of the lower affixing part in the vehicle-widthwise direction and said second front grille locking part being arranged on the upright section.

2. The headlamp-affixing structure according to claim 1, wherein the upper affixing part and the upper section of the headlamp are fastened together with the downward-facing fastening member so as to be affixed to the vehicle body.

3. The headlamp-affixing structure according to claim 1, wherein the inner end of the horizontal section includes an opening,
   a protruding part is arranged at a position corresponding to the opening, the protruding part formed on an inner side surface of the headlamp in the vehicle-widthwise direction, and
   the protruding part protrudes inward in the vehicle-widthwise direction from the headlamp to the opening so as to engage with the opening.

4. The headlamp-affixing structure according to claim 3, wherein a front surface of the protruding part is formed as a slant surface that slants in a backward direction of the vehicle body as the slant surface extends from a base end of the protruding part to a free end of the protruding part.

5. The headlamp-affixing structure according to claim 4, wherein the headlamp includes an upper affixing contact part placed on and affixed to the upper affixing part, an upper positioning pin protruding from the upper affixing contact part to the upper affixing part, a lower affixing contact part placed on and affixed to the lower affixing part, and a lower positioning pin protruding from the lower affixing contact part to the lower affixing part,
   an upper positioning hole into which the upper positioning pin is inserted is arranged on the upper affixing part, and
   a lower positioning hole into which the lower positioning pin is inserted is arranged on the lower affixing part.

6. The headlamp-affixing structure according to claim 3, wherein a front bumper locking part for locking the front bumper is arranged on the headlamp bracket.

7. The headlamp-affixing structure according to claim 3, wherein the headlamp includes an upper affixing contact part placed on and affixed to the upper affixing part, an upper positioning pin protruding from the upper affixing contact part to the upper affixing part, a lower affixing contact part placed on and affixed to the lower affixing part, and a lower positioning pin protruding from the lower affixing contact part to the lower affixing part,
   an upper positioning hole into which the upper positioning pin is inserted is arranged on the upper affixing part, and
   a lower positioning hole into which the lower positioning pin is inserted is arranged on the lower affixing part.

8. The headlamp-affixing structure according to claim 1, wherein a front bumper locking part for locking the front bumper is arranged on the headlamp bracket.

9. The headlamp-affixing structure according to claim 8, wherein a front surface of the protruding part is formed as a slant surface that slants in a backward direction of the vehicle body as the slant surface extends from a base end of the protruding part to a free end of the protruding part.

10. The headlamp-affixing structure according to claim 8, wherein the headlamp includes an upper affixing contact part placed on and affixed to the upper affixing part, an upper positioning pin protruding from the upper affixing contact part to the upper affixing part, a lower affixing contact part placed on and affixed to the lower affixing part, and a lower positioning pin protruding from the lower affixing contact part to the lower affixing part, an upper positioning hole into which the upper positioning pin is inserted is arranged on the upper affixing part, and a lower positioning hole into which the lower positioning pin is inserted is arranged on the lower affixing part.

11. The headlamp-affixing structure according to claim 1, wherein the headlamp includes an upper affixing contact part placed on and affixed to the upper affixing part, an upper positioning pin protruding from the upper affixing contact part to the upper affixing part, a lower affixing contact part placed on and affixed to the lower affixing part, and a lower positioning pin protruding from the lower affixing contact part to the lower affixing part, an upper positioning hole into which the upper positioning pin is inserted is arranged on the upper affixing part, and a lower positioning hole into which the lower positioning pin is inserted is arranged on the lower affixing part.

12. The headlamp-affixing structure according to claim 2, wherein the inner end of the horizontal section includes an opening, a protruding part is arranged at a position corresponding to the opening, the protruding part formed on an inner side surface of the headlamp in the vehicle-widthwise direction, and the protruding part protrudes inward in the vehicle-widthwise direction from the headlamp to the opening so as to engage with the opening.

13. The headlamp-affixing structure according to claim 2, wherein a front bumper locking part for locking the front bumper is arranged on the headlamp bracket.

* * * * *